United States Patent
Lee et al.

(10) Patent No.: US 11,549,164 B2
(45) Date of Patent: Jan. 10, 2023

(54) HYDROGEN STORAGE ALLOY

(71) Applicant: KOREA INSTITUTE OF SCIENCE AND TECHNOLOGY, Seoul (KR)

(72) Inventors: Young-Su Lee, Seoul (KR); Young Whan Cho, Seoul (KR); Jae-Hyeok Shim, Seoul (KR); Jin-Yoo Suh, Seoul (KR); Jihyun Hong, Seoul (KR); Jee Yun Jung, Seoul (KR); June Hyung Kim, Seoul (KR); Mohammad Faisal, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 141 days.

(21) Appl. No.: 17/131,294

(22) Filed: Dec. 22, 2020

(65) Prior Publication Data

US 2022/0127703 A1    Apr. 28, 2022

(30) Foreign Application Priority Data

Oct. 26, 2020  (KR) .......................... 10-2020-0139385

(51) Int. Cl.
*C22C 38/14* (2006.01)
*C22C 38/12* (2006.01)

(52) U.S. Cl.
CPC .............. *C22C 38/14* (2013.01); *C22C 38/12* (2013.01); *C22C 2202/04* (2013.01)

(58) Field of Classification Search
CPC ..... C22C 38/14; C22C 38/12; C22C 2202/04; Y02E 60/32
See application file for complete search history.

(56) References Cited

FOREIGN PATENT DOCUMENTS

KR        10-0534078 B1    12/2005

OTHER PUBLICATIONS

A. Guéguen et al, "Influence of the addition of vanadium on the hydrogenation properties of the compounds TiFe0.9Vx and TiFe0.8Mn0.1Vx (x = 0, 0.05 and 0.1)", Journal of Alloys and Compounds 509 (2011) 5562-5566. (Year: 2011).*
OBin Wang, et al. " Deoxidation Study On V—Ti—Fe as Hydrogen Storage Alloy", 579 TMS (The Minerals, Metals & Materials Society, 2015 (Year: 2015).*
A. Guéguen et al., "Influence of the addition of vanadium on the hydrogenation properties of the compounds TiFe0.9Vx and TiFe0.8Mn0.1Vx (x = 0, 0.05 and 0.1) ".Journal of Alloys and Compounds, 509 (2011), pp. 5562-5566.
Bin Wang et al., Deoxidation Study on V—Ti—Fe as Hydrogen Storage Alloy. 6th International Symposium on High-Temperature Metallurgical Processing,(2015), pp. 579-586.
Jee Yun Jung et al., "Tailoring the equilibrium hydrogen pressure of TiFe via vanadium substitution," Journal of Alloys and Compounds, vol. 854, pp. 1-10, 2021.

* cited by examiner

*Primary Examiner* — Anthony J Zimmer
*Assistant Examiner* — Nazmun Nahar Shams
(74) *Attorney, Agent, or Firm* — Rabin & Berdo, P.C.

(57) ABSTRACT

Provided is a hydrogen storage alloy including a ternary alloy of titanium (Ti), iron (Fe), and vanadium (V), wherein V sites in the ternary alloy correspond to some of Ti sites in a binary TiFe alloy including Ti and Fe, and some of Fe sites in the binary TiFe alloy.

3 Claims, 5 Drawing Sheets

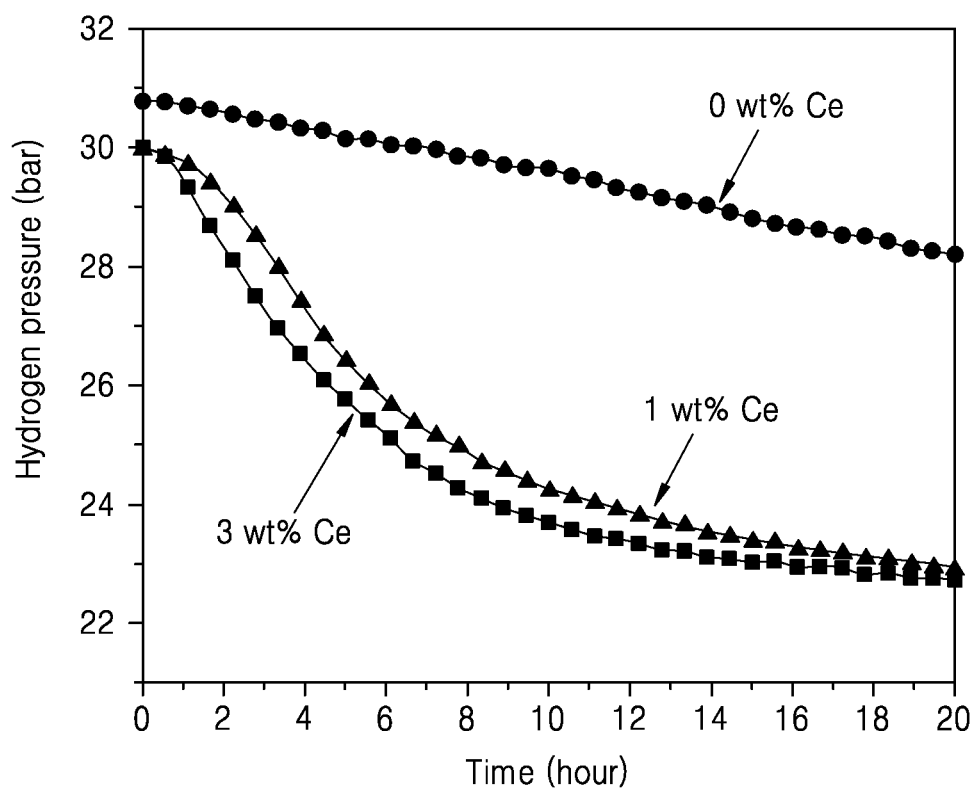

HYDROGEN STORAGE ALLOY

CROSS-REFERENCE TO RELATED PATENT APPLICATION

This application claims the benefit of Korean Patent Application No. 10-2020-0139385, filed on Oct. 26, 2020, in the Korean Intellectual Property Office, the disclosure of which is incorporated herein in its entirety by reference.

BACKGROUND OF THE INVENTION

1. Field of the Invention

The present invention relates to an alloy and, more particularly, to a hydrogen storage alloy.

2. Description of the Related Art

As a representative example of a room-temperature hydrogen storage alloy, lanthanum-nickel ($LaNi_5$) is used for most commercial hydrogen storage tanks but uses large quantities of rare-earth resources and thus a material to replace the same is required. Titanium-iron (TiFe), which attracts much attention as the material to replace $LaNi_5$, uses cheap and abundant raw materials and has a theoretical capacity greater than that of $LaNi_5$. However, hydrogen absorption or desorption occurs in two steps and a usable capacity in a given operating pressure range decreases due to a large equilibrium hydrogen pressure difference between reactions. In addition, an initial hydrogen absorption (activation) process is not fast at room temperature.

RELATED ART DOCUMENT

Patent Document

Korean Patent Application No. 10-2005-0075360

SUMMARY OF THE INVENTION

The present invention provides a hydrogen storage alloy capable of optimizing hydrogen absorption and desorption pressures and enabling room-temperature activation. However, the scope of the present invention is not limited thereto.

According to an aspect of the present invention, there is provided a hydrogen storage alloy including a ternary alloy of titanium (Ti), iron (Fe), and vanadium (V), wherein V sites in the ternary alloy correspond to some of Ti sites in a binary TiFe alloy including Ti and Fe, and some of Fe sites in the binary TiFe alloy.

The ternary alloy may have a composition of $Ti_{1-x}Fe_{1-y}V_{x+y}$ satisfying $0.03<y<0.07$ and $0.05<x<0.1$.

According to an aspect of the present invention, there is provided a hydrogen storage alloy including a quaternary alloy of titanium (Ti), iron (Fe), vanadium (V), and cerium (Ce), wherein V sites in the quaternary alloy correspond to some of Ti sites in a binary TiFe alloy including Ti and Fe, and some of Fe sites in the binary TiFe alloy.

Ce may be added by 1 wt % to 6 wt % of the whole quaternary alloy.

Except for Ce, the quaternary alloy may have a composition of $Ti_{1-x}Fe_{1-y}V_{x+y}$ satisfying $0.03<y<0.07$ and $0.05<x<0.1$.

More than 90% of hydrogen desorption may occur within a range from 1 bar to 10 bar.

A hydrogen storage capacity under a condition lower than 10 bar for hydrogen absorption and higher than 1 bar for hydrogen desorption may be greater than 1 wt %.

BRIEF DESCRIPTION OF THE DRAWINGS

The above and other features and advantages of the present invention will become more apparent by describing in detail embodiments thereof with reference to the attached drawings in which:

FIG. 9 is a graph showing room-temperature activation properties based on the content of cerium (Ce) in a hydrogen storage alloy according to Experimental Example B3 of the present invention.

DETAILED DESCRIPTION OF THE INVENTION

Figure 1:
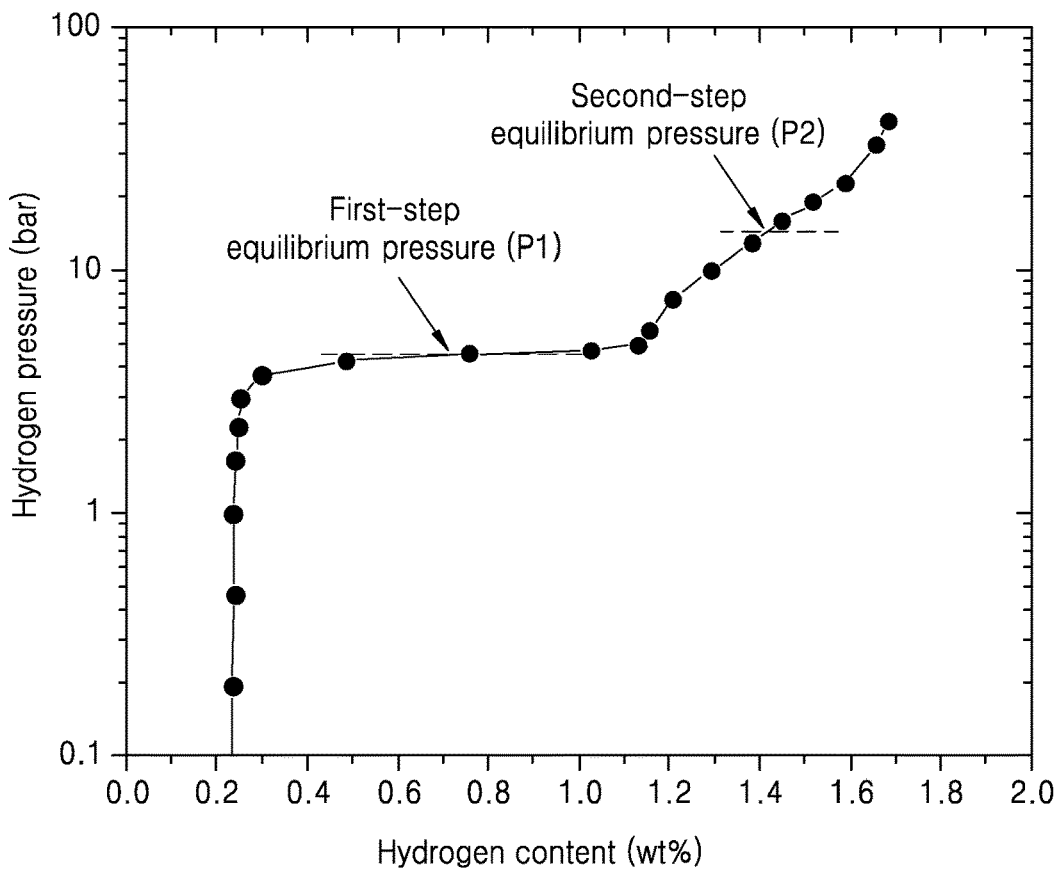
FIG. 1 is a graph for describing the hydrogen storage principle of a titanium-iron (TiFe) hydrogen storage alloy.

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the sizes of at least some elements may be exaggerated or reduced for convenience of explanation and like reference numerals denote like elements.

FIG. 1 is a graph for describing the hydrogen storage principle of a titanium-iron (TiFe) hydrogen storage alloy.

Referring to FIG. 1, the TiFe hydrogen storage alloy may store hydrogen through two-step storage reactions described below.

First step: $TiFeH \leftrightarrows TiFe + \frac{1}{2}H_2$ (Equilibrium pressure: P1)

Second step: $TiFeH_2 \leftrightarrows TiFeH + \frac{1}{2}H_2$ (Equilibrium pressure: P2)

However, the TiFe hydrogen storage alloy exhibits high equilibrium pressures P1 and P2 at room temperature. In addition, a P2/P1 ratio is high and thus hydrogen absorption or desorption occurs in a wide pressure range. Furthermore, initial hydrogen absorption is not fast at room temperature.

To solve the above problem, some ternary TiFe-M hydrogen storage alloys were studied, and those alloys exhibited not only effects such as an improvement in performance of initial hydrogen absorption and decreases in P1 and P2 but also a problem such as an increase in P2/P1. That is, a problem of decreasing a usable capacity in an operating pressure range (e.g., 10 bar for absorption and 1 bar for desorption) was exhibited.

According to the present invention, a hydrogen storage alloy capable of optimizing hydrogen absorption and desorption pressures and enabling room-temperature activation is implemented by providing a ternary hydrogen storage alloy including titanium (Ti), iron (Fe), and vanadium (V) in a certain composition range, or a quaternary hydrogen storage alloy including Ti, Fe, V, and cerium (Ce). Hydrogen storage alloys of the present invention show that more than 90% of hydrogen desorption occurs within a range from 1 bar to 10 bar and that a hydrogen storage capacity under a condition lower than 10 bar for hydrogen absorption and higher than 1 bar for hydrogen desorption is greater than 1 wt %.

A hydrogen storage alloy according to an embodiment of the present invention is a ternary alloy of Ti, Fe, and V, and V sites in the ternary alloy correspond to some of Ti sites in a binary TiFe alloy including Ti and Fe, and some of Fe sites in the binary TiFe alloy.

Herein, the fact that the V sites in the ternary alloy correspond to some of the Ti sites in the binary TiFe alloy means that the ternary alloy is implemented by substituting V for Ti in some of the Ti sites in the binary TiFe alloy.

In addition, the fact that the V sites in the ternary alloy correspond to some of the Fe sites in the binary TiFe alloy means that the ternary alloy is implemented by substituting V for Fe in some of the Fe sites in the binary TiFe alloy.

The ternary alloy may have a composition of $Ti_{1-x}Fe_{1-y}V_{x+y}$ satisfying $0.03<y<0.07$ and $0.05<x<0.1$.

The hydrogen storage alloy according to an embodiment of the present invention shows that equilibrium hydrogen pressures P1 and P2 may be generally lowered by increasing the value y within the above-described range and a P2/P1 ratio may be lowered by decreasing an equilibrium hydrogen pressure difference between first and second steps by increasing the value x within the above-described range. The decrease in the equilibrium hydrogen pressure difference between the first and second steps may be advantageous in that TiFe hydrogenation reactions of the first and second steps may occur within a relatively narrow pressure range.

In the hydrogen storage alloy according to an embodiment of the present invention, hydrogen desorption may mostly occur in a range from 1 bar to 10 bar and a hydrogen storage capacity greater than 1 wt % may be ensured under a condition of 10 bar for absorption and 1 bar for desorption.

A hydrogen storage alloy according to another embodiment of the present invention is a quaternary alloy of Ti, Fe, V, and Ce, and V sites in the quaternary alloy correspond to some of Ti sites in a binary TiFe alloy including Ti and Fe, and some of Fe sites in the binary TiFe alloy.

Herein, the fact that the V sites in the quaternary alloy correspond to some of the Ti sites in the binary TiFe alloy means that a ternary alloy is implemented by substituting V for Ti in some of the Ti sites in the binary TiFe alloy, and the quaternary alloy is ultimately implemented by adding Ce to the ternary alloy.

In addition, the fact that the V sites in the quaternary alloy correspond to some of the Fe sites in the binary TiFe alloy means that a ternary alloy is implemented by substituting V for Fe in some of the Fe sites in the binary TiFe alloy, and the quaternary alloy is ultimately implemented by adding Ce to the ternary alloy.

In the hydrogen storage alloy according to another embodiment of the present invention, except for Ce, the quaternary alloy may have a composition of $Ti_{1-x}Fe_{1-y}V_{x+y}$ satisfying $0.03<y<0.07$ and $0.05<x<0.1$.

In the hydrogen storage alloy according to another embodiment of the present invention, Ce may be added by 1 wt % to 6 wt % of the whole quaternary alloy. Ce is an element added for room-temperature activation. Ce is mostly oxidized and thus performs a minor function when Ce is added by less than 1 wt %, and an effect of decreasing a hydrogen storage capacity is increased when Ce is added by more than 6 wt %.

Figure 2:
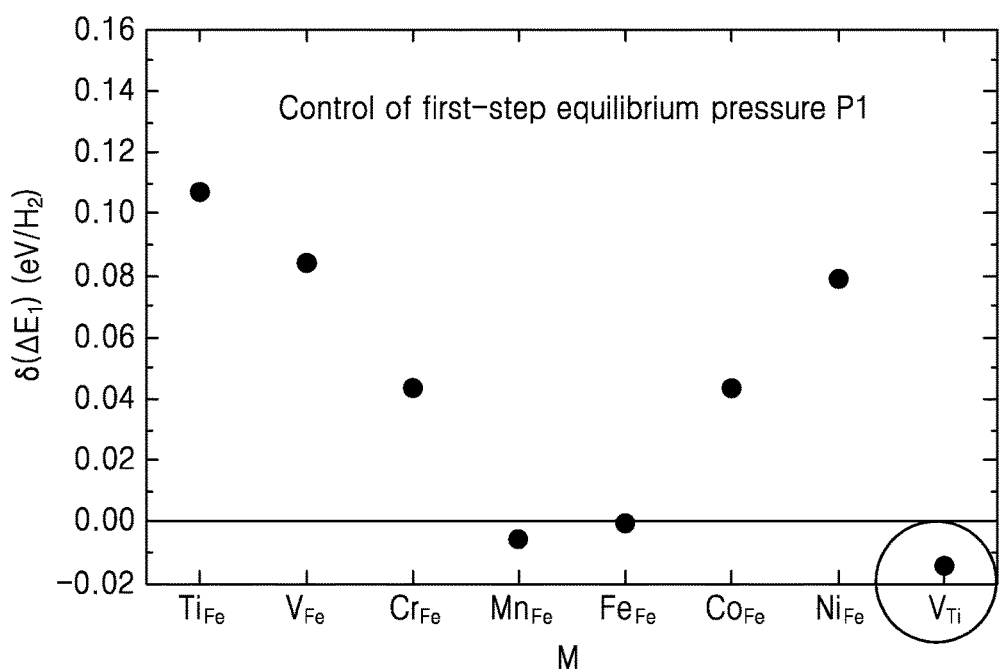
FIG. 2 is a graph showing a result of predicting an alloy element effect (e.g., control of a first-step equilibrium pressure P1) by using first principles calculation in a hydrogen storage alloy according to an embodiment of the present invention.
Figure 3:
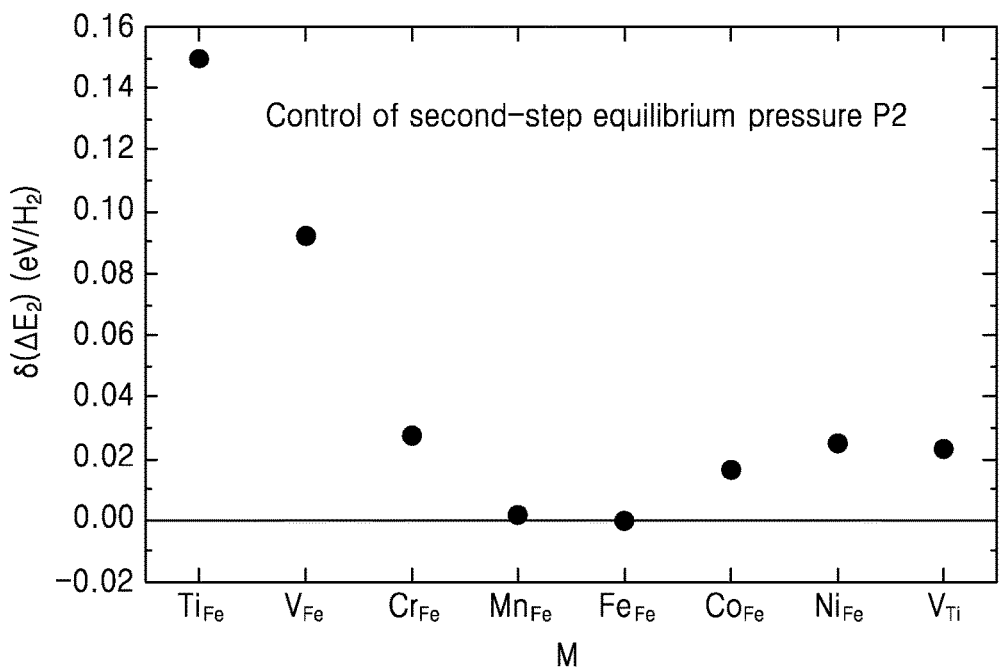
FIG. 3 is a graph showing a result of predicting an alloy element effect (e.g., control of a second-step equilibrium pressure P2) by using first principles calculation in a hydrogen storage alloy according to an embodiment of the present invention.

FIG. 2 is a graph showing a result of predicting an alloy element effect (e.g., control of a first-step equilibrium pressure P1) by using first principles calculation in a hydrogen storage alloy according to an embodiment of the present invention, and FIG. 3 is a graph showing a result of predicting an alloy element effect (e.g., control of a second-step equilibrium pressure P2) by using first principles calculation in a hydrogen storage alloy according to an embodiment of the present invention.

Referring to FIGS. 2 and 3, energy changes in first-step and second-step reactions in cases when various alloy elements M substitute for an element of a binary TiFe alloy are predicted. That is, an optimal alloy element is found by predicting the energy changes in the first-step and second-step reactions with respect to Ti substitution ($M_{Ti}$) or Fe substitution ($M_{Fe}$). When $\delta(\Delta E_1)$ and $\delta(\Delta E_2)$ have positive values, hydrogen-absorbed states in the first-step and second-step reactions (i.e., left terms of reaction formulas) after the alloy elements M substitute for Ti or Fe are more stable. Therefore, the equilibrium pressures P1 and P2 decrease.

Because an equilibrium hydrogen pressure decreases when $\delta(\Delta E)$ is greater than 0 and increases when $\delta(\Delta E)$ is less than 0, it is shown that a P2/P1 ratio may be lowered by using $V_{Fe}$ to generally decrease P1 and P2 and using $V_{Ti}$ to increase P1. Particularly, FIG. 2 shows that $\delta(\Delta E_1)$ is meaningfully less than 0 only in the case of $V_{Ti}$.

A composition range capable of optimizing hydrogen absorption and desorption pressures and enabling room-temperature activation in a ternary hydrogen storage alloy including Ti, Fe, and V or a quaternary hydrogen storage alloy including Ti, Fe, V, and Ce will now be described.

Table 1 shows compositions of ternary hydrogen storage alloys including Ti, Fe, and V and quaternary hydrogen storage alloys including Ti, Fe, V, and Ce, according to experimental examples of the present invention.

For the experimental examples of the present invention, samples of about 30 g were prepared through arc melting in an argon (Ar) atmosphere (purities of raw materials of Ti, Fe, V, and Ce are equal to or higher than 99.9%). The samples were vacuum-sealed in quartz tubes, heat-treated (at 1000° C. for one to three weeks), and then quenched. An activation process was performed to facilitate hydrogen absorption or desorption, and equilibrium hydrogen absorption or desorption properties were measured.

TABLE 1

| Experimental Example | $Ti_{1-x}Fe_{1-y}V_{x+y}$ | x | y | Ce |
|---|---|---|---|---|
| A1 | $Ti_{0.93}Fe_{0.96}V_{0.11}$ | 0.07 | 0.04 | 3 wt % |
| A2 | $Ti_{0.93}Fe_{0.95}V_{0.12}$ | 0.07 | 0.05 | 3 wt % |
| A3 | $Ti_{0.92}Fe_{0.95}V_{0.13}$ | 0.08 | 0.05 | 3 wt % |
| B1 | $Ti_1Fe_1$ | 0.00 | 0.00 | 0 wt % |
| B2 | $Ti_1Fe_{0.98}V_{0.02}$ | 0.00 | 0.02 | 3 wt % |
| B3 | $Ti_1Fe_{0.96}V_{0.04}$ | 0.00 | 0.04 | 3 wt % |
| B4 | $Ti_1Fe_{0.94}V_{0.06}$ | 0.00 | 0.06 | 0 wt % |
| B5 | $Ti_1Fe_{0.9}V_{0.1}$ | 0.00 | 0.10 | 0 wt % |

Figure 4:
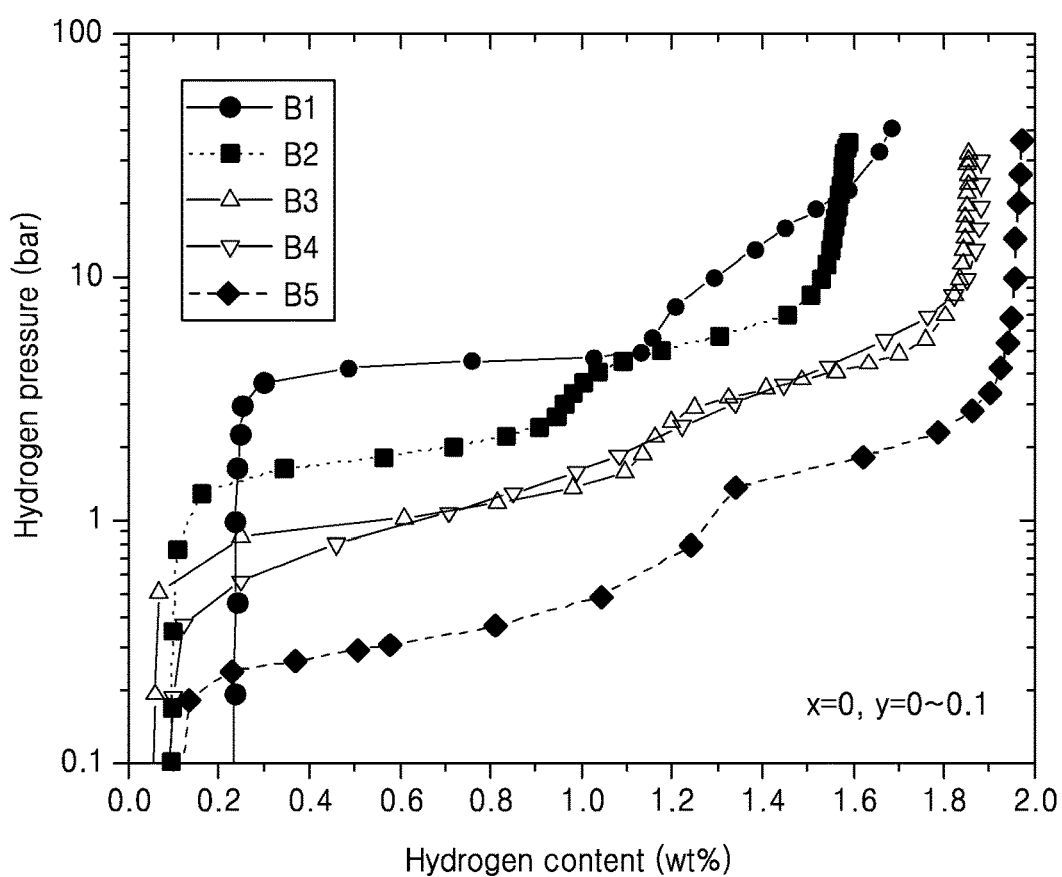
FIG. 4 is a graph showing changes in hydrogen desorption pressure based on a quantity y of vanadium (V) substituting for iron (Fe) in hydrogen storage alloys according to experimental examples of the present invention.

FIG. 4 is a graph showing changes in hydrogen desorption pressure based on a quantity y of V substituting for Fe in hydrogen storage alloys according to experimental examples of the present invention.

Referring to Table 1 and FIG. 4, the quantities y of V substituting for Fe in the hydrogen storage alloys of Experimental Examples B1, B2, B3, B4, and B5 are 0, 0.02, 0.04, 0.06, and 0.10, respectively. When converted to atomic percentages (at %), the substituting quantities y correspond to 0 at %, 2 at %, 4 at %, 6 at %, and 10 at %, respectively.

It is shown that equilibrium hydrogen pressures P1 and P2 generally decrease in proportional to the quantity y of V substituting for Fe in the hydrogen storage alloy. However, the hydrogen storage alloys of Experimental Examples B1 and B2 exhibit relatively high values of P2, and the hydrogen storage alloy of Experimental Example B5 exhibits the equilibrium hydrogen pressure P1 much lower than 1 bar. In contrast, the hydrogen storage alloys of Experimental Examples B3 and B4 exhibit both P1 and P2 in a pressure range appropriate for a condition of 10 bar for absorption and 1 bar for desorption. The values of P1 are slightly low to satisfy the condition of 1 bar for desorption but may be controlled based on a quantity x of V substituting for Ti. Therefore, the quantity y of V substituting for Fe in the hydrogen storage alloys according to the experimental examples of the present invention may be controlled within a range from 0.03 to 0.07.

Figure 5:
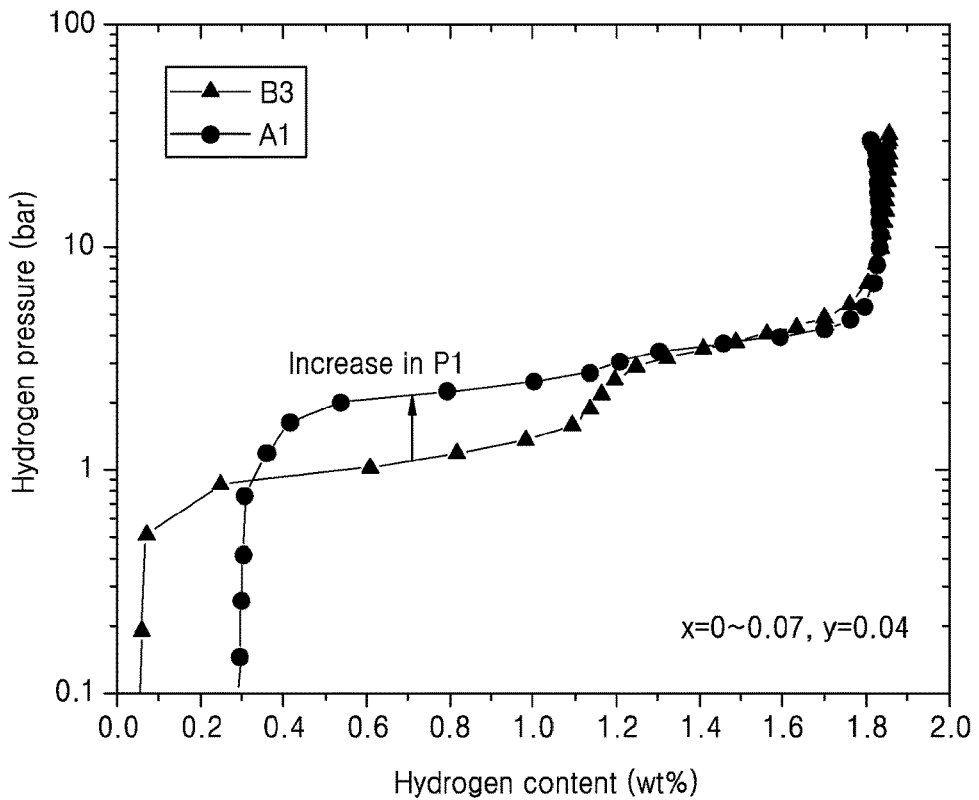
FIG. 5 is a graph showing changes in hydrogen desorption pressure based on a quantity x of V substituting for titanium (Ti) in hydrogen storage alloys according to experimental examples of the present invention.

FIG. 5 is a graph showing changes in hydrogen desorption pressure based on the quantity x of V substituting for Ti in hydrogen storage alloys according to experimental examples of the present invention.

Referring to Table 1 and FIG. 5, the hydrogen storage alloys of Experimental Examples A1 and B3 are quaternary alloys of Ti, Fe, V, and Ce and, when the composition of the quaternary alloys except for Ce is $Ti_{1-x}Fe_{1-y}V_{x+y}$, the quantities y of V substituting for Fe are equally 0.04 and the quantities x of V substituting for Ti are 0.07 and 0, respectively. When converted to atomic percentages (at %), the substituting quantities x correspond to 7 at % and 0 at %, respectively. Ce is added to both quaternary alloys equally by 3 wt %.

Referring to FIG. 5, it is shown that the equilibrium hydrogen pressure P1 higher than 1 bar may be achieved in a first step when the quantity x of V substituting for Ti is greater than about 0.05.

Figure 6:
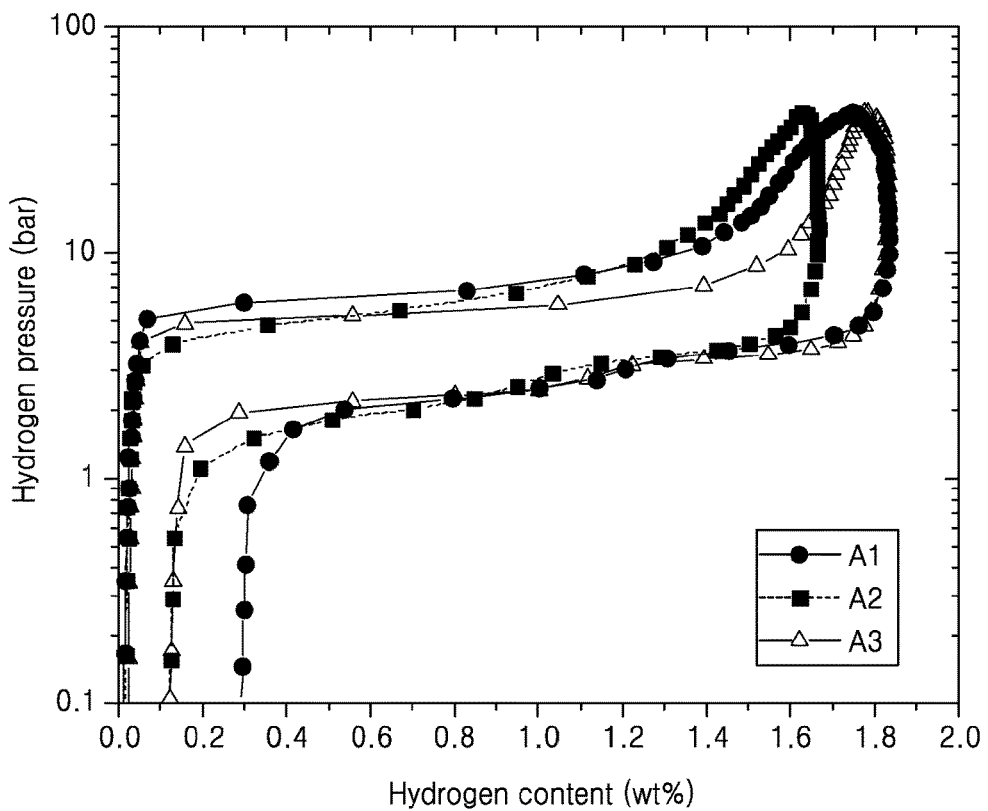
FIG. 6 is a graph showing hydrogen absorption pressures and hydrogen desorption pressures in hydrogen storage alloys according to Experimental Examples A1, A2, and A3 of the present invention.

FIG. 6 is a graph showing hydrogen absorption pressures and hydrogen desorption pressures in the hydrogen storage alloys according to Experimental Examples A1, A2, and A3 of the present invention. In the graph of FIG. 6, the hydrogen absorption pressures are relatively higher than the hydrogen desorption pressures.

Referring to FIG. 6, in the hydrogen storage alloys according to Experimental Examples A1, A2, and A3 of the present invention, the quantity x of V substituting for Ti is greater than 0.05 and less than 0.1, and the quantity y of V substituting for Fe is greater than 0.03 and less than 0.07. The hydrogen storage alloys in this case show that more than 90% of hydrogen desorption occurs within a range from 1 bar to 10 bar and that a hydrogen storage capacity under a condition lower than 10 bar for hydrogen absorption and higher than 1 bar for hydrogen desorption is greater than 1 wt %.

Figure 7:
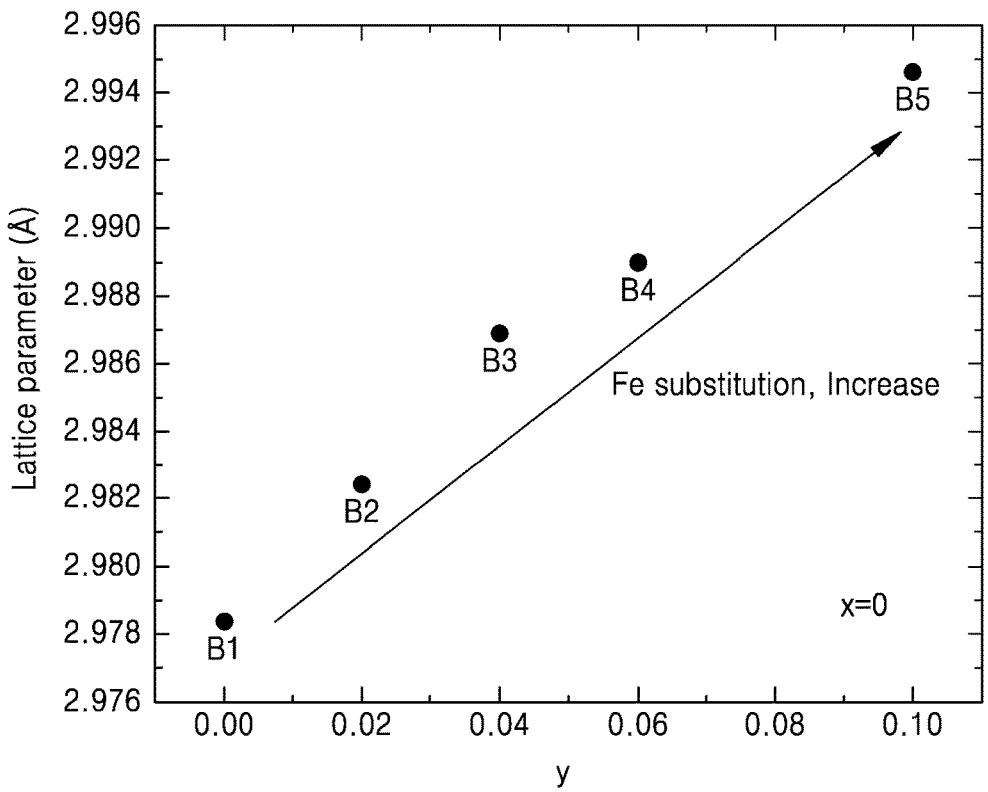
FIGS. 7 and 8 are graphs showing lattice parameters of $Ti_{1-x}Fe_{1-y}V_{x+y}$ obtained through X-ray diffraction analysis in hydrogen storage alloys according to experimental examples of the present invention.
Figure 8:
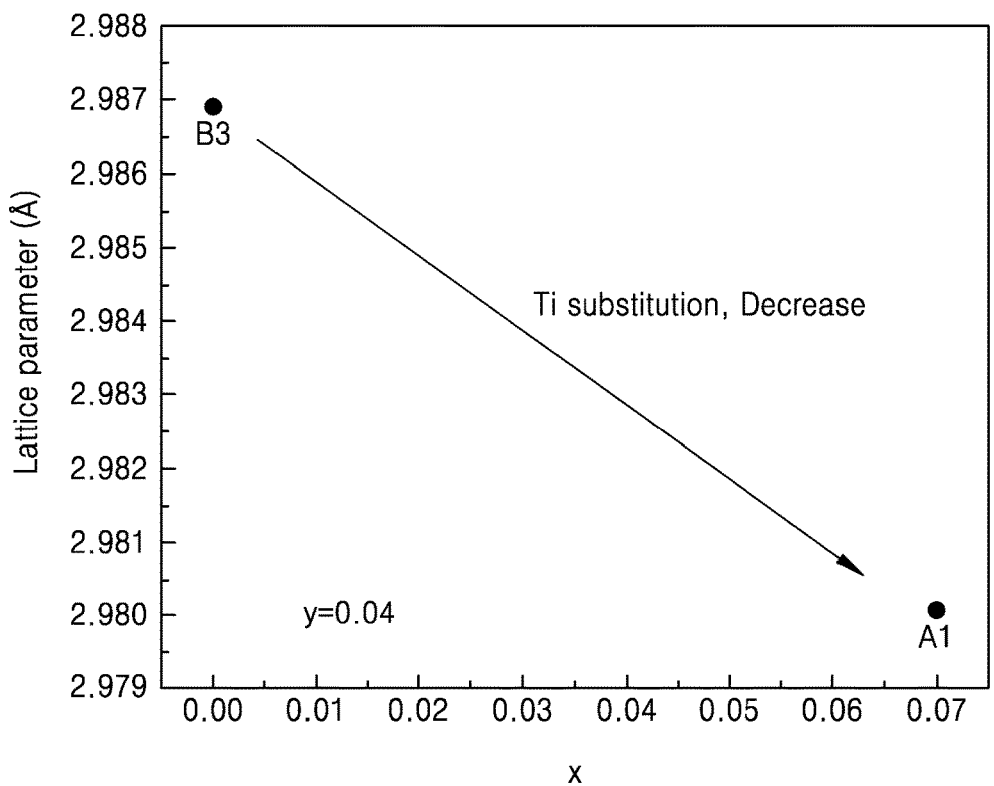

FIGS. 7 and 8 are graphs showing lattice parameters of $Ti_{1-x}Fe_{1-y}V_{x+y}$ obtained through X-ray diffraction analysis in hydrogen storage alloys according to experimental examples of the present invention.

Because atom sizes satisfy Fe<V<Ti, the lattice parameter needs to increase when V substitutes for Fe and decrease when V substitutes for Ti.

Referring to FIG. 7, it is shown that the lattice parameter increases when the quantity y of V substituting for Fe increases to 0, 0.02, 0.04, 0.06, and 0.10 in the hydrogen storage alloys of Experimental Examples B1, B2, B3, B4, and B5, respectively.

Referring to FIG. 8, the hydrogen storage alloys of Experimental Examples A1 and B3 are quaternary alloys of Ti, Fe, V, and Ce and, when the composition of the quaternary alloys except for Ce is $Ti_{1-x}Fe_{1-y}V_{x+y}$, the quantities y of V substituting for Fe are equally 0.04 and the quantities x of V substituting for Ti are 0.07 and 0, respectively. Ce is added to both quaternary alloys equally by 3 wt %.

It is shown that the lattice parameter of the hydrogen storage alloy of Experimental Example A1 is less than Experimental Example B3.

Based on the results of FIGS. 7 and 8 together, it is shown that the lattice parameter obtained using X-ray diffraction is consistent with the prediction result and that V substitutes for some Fe and Ti sites as desired.

That is, it is shown that, when the hydrogen storage alloy of the present invention is a ternary alloy of Ti, Fe, and V, V sites in the ternary alloy correspond to some of Ti sites in a binary TiFe alloy including Ti and Fe, and some of Fe sites in the binary TiFe alloy.

It is also shown that, when the hydrogen storage alloy of the present invention is a quaternary alloy of Ti, Fe, V, and Ce, and V sites in the quaternary alloy correspond to some of Ti sites in a binary TiFe alloy including Ti and Fe, and some of Fe sites in the binary TiFe alloy.

FIG. 9 is a graph showing room-temperature activation properties based on the content of Ce in a hydrogen storage alloy according to an experimental example of the present invention.

Referring to FIG. 9, an activation process (i.e., a process of initially absorbing hydrogen on an alloy) is performed by changing the content of Ce in the hydrogen storage alloy having the Ti—Fe—V composition of Experimental Example B3 (i.e., $Ti_1Fe_{0.96}V_{0.04}$) to 0 wt %, 1 wt %, and 3 wt %.

When a stainless-steel reactor is charged with about 0.5 g of the hydrogen storage alloy, is filled with hydrogen at a pressure of about 30 bar at room temperature, and is maintained in a sealed state, the hydrogen storage alloy absorbs hydrogen and thus the pressure of hydrogen in the reactor decreases based on time. The faster the hydrogen storage alloy absorbs hydrogen, the faster the pressure of hydrogen decreases. It is shown that, when the same Ti—Fe—V composition is maintained and only the content of Ce is changed, an initial hydrogen absorption rate of the alloy including 1 wt % or 3 wt % of Ce is higher than that of the alloy not including Ce.

According to the afore-described embodiments of the present invention, a hydrogen storage alloy capable of optimizing hydrogen absorption and desorption pressures and enabling room-temperature activation may be implemented. However, the scope of the present invention is not limited to the above-described effect.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A hydrogen storage alloy comprising a ternary alloy of titanium (Ti), iron (Fe), and vanadium (V), wherein V sites in the ternary alloy correspond to some of Ti sites in a binary TiFe alloy comprising Ti and Fe, and some of Fe sites in the binary TiFe alloy;
    wherein the ternary alloy has a composition of $Ti_{1-x}Fe_{1-y}V_{x+y}$ satisfying $0.03<y<0.07$ and $0.05<x<0.1$; and
    wherein after initially absorbing hydrogen on the alloy more than 90% of hydrogen desorption occurs within a range from 1 bar to 10 bar.

2. A hydrogen storage alloy comprising a quaternary alloy of titanium (Ti), iron (Fe), vanadium (V), and cerium (Ce), wherein V sites in the quaternary alloy correspond to some of Ti sites in a binary TiFe alloy comprising Ti and Fe, and some of Fe sites in the binary TiFe alloy; and
    wherein Ce is added by 1 wt % to 6 wt % of the whole quaternary alloy; and
    wherein, except for Ce, the quaternary alloy has a composition of $Ti_{1-x}Fe_{1-y}V_{x+y}$ satisfying $0.03<y<0.07$ and $0.05<x<0.1$; and
    wherein after initially absorbing hydrogen on the alloy more than 90% of hydrogen desorption occurs within a range from 1 bar to 10 bar.

3. The hydrogen storage alloy of claim 1, wherein a hydrogen storage capacity under a condition lower than 10 bar for hydrogen absorption and higher than 1 bar for hydrogen desorption is greater than 1 wt %.

* * * * *